(12) United States Patent
Shim (10) Patent No.: US 7,192,377 B2
(45) Date of Patent: Mar. 20, 2007

(54) SIX-SPEED POWERTRAIN OF AN AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 124 days.

(21) Appl. No.: 11/001,605

(22) Filed: Dec. 1, 2004

(65) Prior Publication Data
US 2005/0143214 A1 Jun. 30, 2005

(30) Foreign Application Priority Data
Dec. 30, 2003 (KR) ........................ 10-2003-0100818

(51) Int. Cl.
*F16H 3/44* (2006.01)
(52) U.S. Cl. ........................ 475/269; 475/278
(58) Field of Classification Search ................ 475/269, 475/271, 280, 281, 284, 296, 275–278, 297, 475/311, 312, 323, 324, 286–289
See application file for complete search history.

(56) References Cited

U.S. PATENT DOCUMENTS 6,827,664 B2 * 12/2004 Stevenson et al. .......... 475/275

2002/0183160 A1 * 12/2002 Kao et al. .................. 475/269
2004/0087409 A1 * 5/2004 Lee et al. .................. 475/269

FOREIGN PATENT DOCUMENTS

| EP | 1265006 A2 | 12/2002 |
|---|---|---|
| JP | 08-254251 | 10/1996 |
| JP | 2000-329201 | 11/2000 |

* cited by examiner

*Primary Examiner*—Ha Ho
*Assistant Examiner*—Justin K. Holmes
(74) *Attorney, Agent, or Firm*—Morgan Lewis & Bockius LLP (57) ABSTRACT

The powertrain includes an arrangement of three single planetary gearsets to form six operational elements, among which a first operational element that always operates as an input element. A second operational element selectively operates as an input element and a stationary element. A third operational element selectively operates as an input element. A fourth operational element selectively operates as a stationary element. A fifth operational element always operates as an output element. A sixth operational element selectively operates as a stationary element.

5 Claims, 8 Drawing Sheets

|  | C1 | C2 | B1 | B2 | B3 | FC |
|---|---|---|---|---|---|---|
| 1st speed |  |  | ● | ○ |  | ● |
| 2nd speed |  |  | ● |  | ● |  |
| 3rd speed | ● |  | ● |  |  |  |
| 4th speed |  | ● | ● |  |  |  |
| 5th speed | ● | ● |  |  |  |  |
| 6th speed |  | ● |  |  | ● |  |
| reverse speed | ● |  |  | ● |  |  |

|  | C1 | C2 | B1 | B2 | B3 | Speed ratio |
|---|---|---|---|---|---|---|
| 1st speed |  |  | ● | ● |  | 4.898 |
| 2nd speed |  |  | ● |  | ● | 2.967 |
| 3rd speed | ● |  | ● |  |  | 1.819 |
| 4th speed |  | ● | ● |  |  | 1.375 |
| 5th speed | ● | ● |  |  |  | 1.000 |
| 6th speed |  | ● |  |  | ● | 0.754 |
| reverse speed | ● |  |  | ● |  | -3.06 |

SIX-SPEED POWERTRAIN OF AN AUTOMATIC TRANSMISSION

CROSS-REFERENCE TO RELATED APPLICATIONS

This application claims priority of Korean Application No. 10-2003-0100818, filed Dec. 30, 2003, the disclosure of which is incorporated herein by reference.

FIELD OF THE INVENTION

The present invention relates to a six-speed powertrain applied to an automatic transmission for a vehicle, enabling six forward speeds.

BACKGROUND OF THE INVENTION

A multi-stage gearshift mechanism of an automatic transmission includes a plurality of planetary gearsets. A powertrain having such a plurality of planetary gearsets varies the torque in multi-stages and outputs it to an output shaft when receiving a converted engine torque from a torque converter. The more speeds the powertrain of an automatic transmission has, the better power performance and fuel consumption. Therefore, it is desirable to have as many speeds as possible in powertrains.

Even for the same number of speeds, durability, power transmission efficiency, and size/weight of a transmission are substantially dependent on how planetary gearsets are arranged. Therefore, research for more structural strength, less power loss, and more compact packaging are under continuing investigation.

Usually, development of a powertrain using planetary gearsets does not devise a wholly new type of planetary gearsets. To the contrary, it invokes how single/double pinion planetary gearsets are combined, and how clutches, brakes, and one-way clutches are disposed to the combination of planetary gearsets such that required shift speeds and speed ratios are realized with minimal power loss.

As for a manual transmission, too many speeds cause a driver the inconvenience of excessive manually shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed.

However, almost all the clutches and brakes of such powertrains are disposed to a rear of the transmission making it difficult to design hydraulic lines for operation of the powertrain. Furthermore, such powertrains can only provide a small range of speed ratios for a reverse speed, thereby deteriorating hill climbing ability in a reverse range. A step ratio between speed ratios of the second and third speeds is large, and accordingly, a high tip-in shock occurs when driving at low speeds in urban areas. Also, the speed ratio of the forward first speed is large, thereby frequently causing tire slip when accelerating the vehicle from a standstill position. Further, the speed ratio in the highest speed is low, and accordingly, driving torque is lowered in the highest speed.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a powertrain of an automatic transmission in which brakes are clutches are dispersedly disposed to front and rear of the transmission such that hydraulic lines may be easily formed, shift feel and responsiveness for 1→2 shifting is enhanced, and hill climbing ability in a reverse speed is enhanced due to a raised reverse speed ratio. The present invention also provides a powertrain of an automatic transmission in which step ratios between speed ratios are optimized such that drivability of a vehicle may be enhanced, a tip-in shock is minimized for a low speed of forward second and third speeds, tire slip is prevented during acceleration in low speed by reducing the speed ratio of the first forward speed, and driving torque is enhanced by increasing speed ratio at the highest shift-speed.

An exemplary six-speed powertrain of an automatic transmission for a vehicle according to an embodiment of the present invention includes: a first planetary gearset of a single pinion planetary gearset having a first sun gear, a first planet carrier, and a first ring gear; a second planetary gearset of a single pinion planetary gearset having a second sun gear, a second planet carrier, and a second ring gear; and a third planetary gearset of a single pinion planetary gearset having a third sun gear, a third planet carrier, and a third ring gear.

In the previously described powertrain, the first ring gear and the second planet carrier, the second ring gear and the third planet carrier, and the third ring gear and the first planet carrier are fixedly interconnected respectively such that the combination of the first, second, and third planetary gearsets form six operational elements. A first operational element always operates as an input element. A second operational element selectively operates as an input element and a stationary element. A third operational element selectively operates as an input element. A fourth operational element selectively operates as a stationary element. A fifth operational element always operates as an output element. A sixth operational element selectively operates as a stationary element.

In a further embodiment, the first operational element corresponds to the second sun gear, the second operational element corresponds to the third sun gear, the third operational element corresponds to the first ring gear and the second planet carrier, the fourth operational element corresponds to the second ring gear and the third planet carrier, the fifth operational element corresponds to the first planet carrier and the third ring gear, and the sixth operational element corresponds to the first sun gear.

In another further embodiment, the first operational element is directly connected to an input shaft, the second operational element is connected to the input shaft interposing a clutch and is also connected to a transmission housing interposing a brake, the third operational element is connected to the input shaft through a clutch, the fourth operational element is connected to the transmission housing through a brake and a one-way clutch, the fifth operational element is connected to an output gear, and the sixth operational element is connected to the transmission housing through a brake.

In a still further embodiment, the clutch and brake interposed to the second and fourth operational elements are disposed to a front of the automatic transmission, and the clutch and brake interposed to the third and sixth operational elements are disposed to a rear of the automatic transmission.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

An embodiment of the present invention will hereinafter be described in detail with reference to the accompanying drawings.

Figure 1:
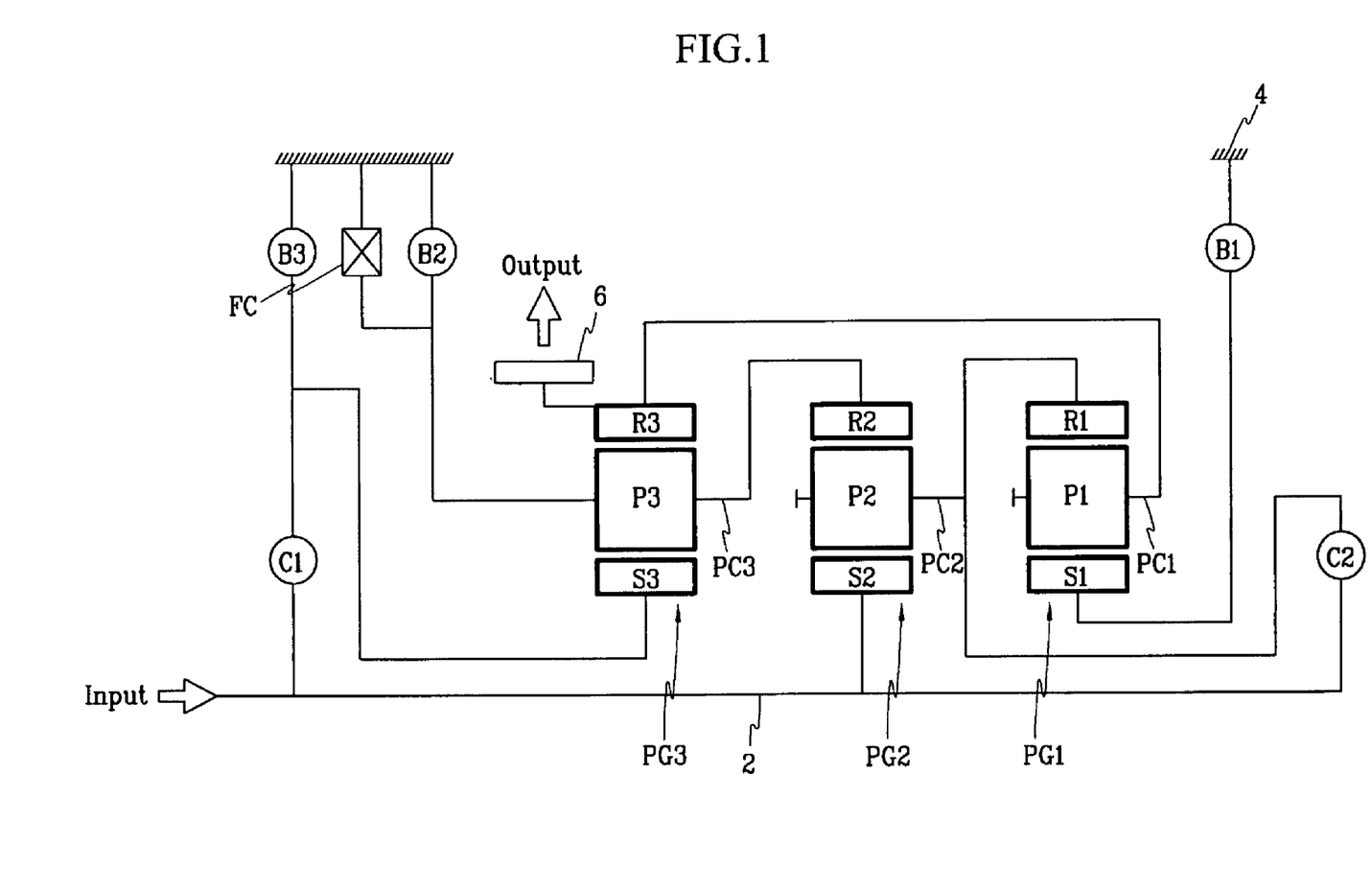
FIG. 1 is a schematic view of a powertrain according to an embodiment of the present invention.

FIG. 1 is a schematic view of a powertrain according to an embodiment of the present invention. The powertrain includes a combination of first, second, and third planetary gearsets PG1, PG2, and PG3 arranged on an input shaft 2 connected to an output side of an engine through a torque converter.

The first planetary gearset PG1 is formed as a single pinion planetary gearset including a first sun gear S1, a first ring gear R1, and a first planet carrier PC1 supporting pinions P1 disposed between and engaged with the first sun gear S1 and the first ring gear R1. The second planetary gearset PG2 is formed as a single pinion planetary gearset including a second sun gear S2, a second ring gear R2, and a second planet carrier PC2 supporting pinions P2 disposed between and engaged with the second sun gear S2 and the second ring gear R2. The third planetary gearset PG3 is formed as a single pinion planetary gearset including a third sun gear S3, a third ring gear R3, and a third planet carrier PC3 supporting pinions P3 disposed between and engaged with the third sun gear S3 and the third ring gear R3. The first, second, and third planetary gearsets PG1, PG2, and PG3 are arranged in a sequence of first, second, and third planetary gearsets PG1, PG2, and PG3 from the rear (i.e., from the end opposite to the input shaft 2) of the transmission.

The first ring gear R1 and the second planet carrier PC2, the second ring gear R2 and the third planet carrier PC3, and the third ring gear R3 are respectively interconnected. In addition, the second sun gear S2 is fixedly connected to the input shaft 2 so as to always function as an input element. The third sun gear S3 and the first ring gear R1 are variably connected to the input shaft 2 interposing first and second clutches C1 and C2 so as to variably function as input elements.

In addition, the first sun gear S1 is variably connected to a housing 4 interposing a first brake B1. The third planet carrier PC3 is connected to the housing 4 interposing a second brake B2 and a one-way clutch FC in parallel. The third sun gear S3 is connected to the housing 4 interposing a third brake B3. The third ring gear R3 is connected to an output gear 6 so as to always function as an output element. According to such a structure, the first clutch C1 and the second and third brakes B2 and B3 are disposed to a front of the transmission (i.e., toward the input shaft 2), and the second clutch C2 and the first brake B1 are disposed to a rear of the transmission (i.e., opposite to input shaft 2).

Figure 2:
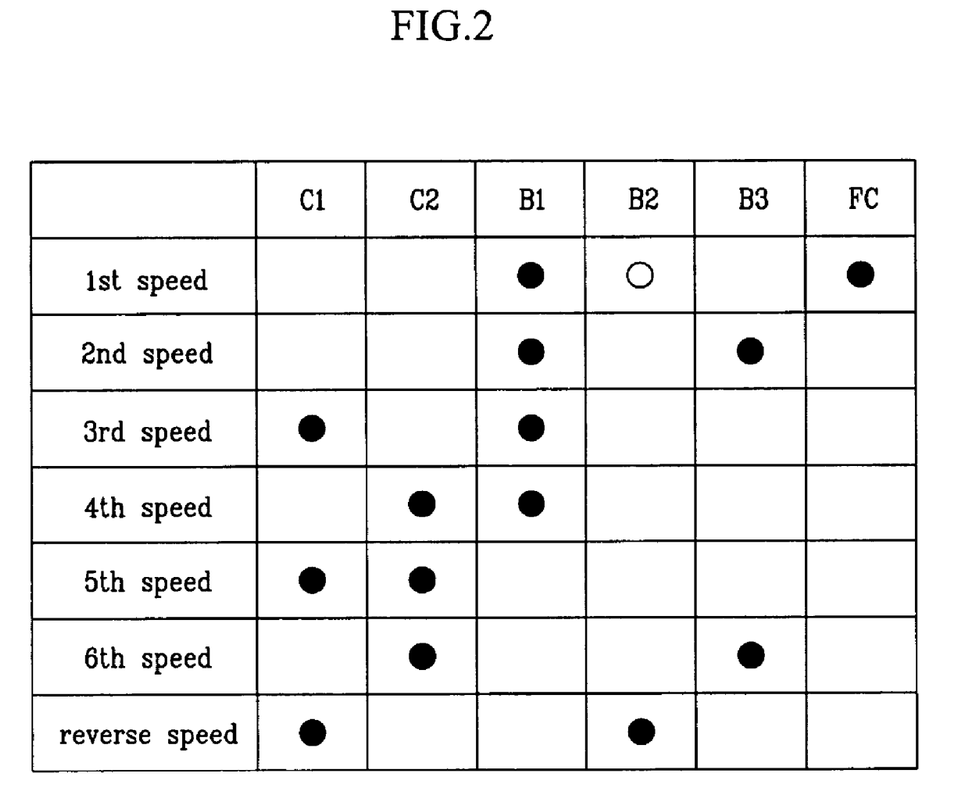
FIG. 2 is an operational chart of a powertrain according to an embodiment of the present invention.

Such a structured powertrain realizes six forward speeds and one reverse speed by operating clutches and brakes according to an operational chart shown in FIG. 2. That is, the first brake B1 and the one-way clutch FC are operated in a first forward speed, the first and third brakes B1 and B3 in a second forward speed, the first clutch C1 and the first brake B1 in a third forward speed, the second clutch C2 and the first brake B1 in a fourth forward speed, the first and second clutches C1 and C2 in a fifth forward speed, the second clutch C2 and the third brake B3 in a sixth forward speed, and the first clutch C1 and the second brake B2 in a reverse speed. Regarding the first forward speed, the second brake B2 may be operated instead of the one-way clutch FC for realizing an engine brake, so the operation of second brake B2 in the first speed is marked with an empty circle in FIG. 2.

Such a powertrain according to an embodiment of the present invention includes a combination of three single pinion planetary gearsets, wherein the first ring gear R1 and the second planet carrier PC2, the second ring gear R2 and the third planet carrier PC3, and the third ring gear R3 and the first planet carrier PC1 are fixedly interconnected, respectively. Therefore, the powertrain according to an embodiment of the present invention forms six operational elements as shown in FIG. 3.

Figure 3:
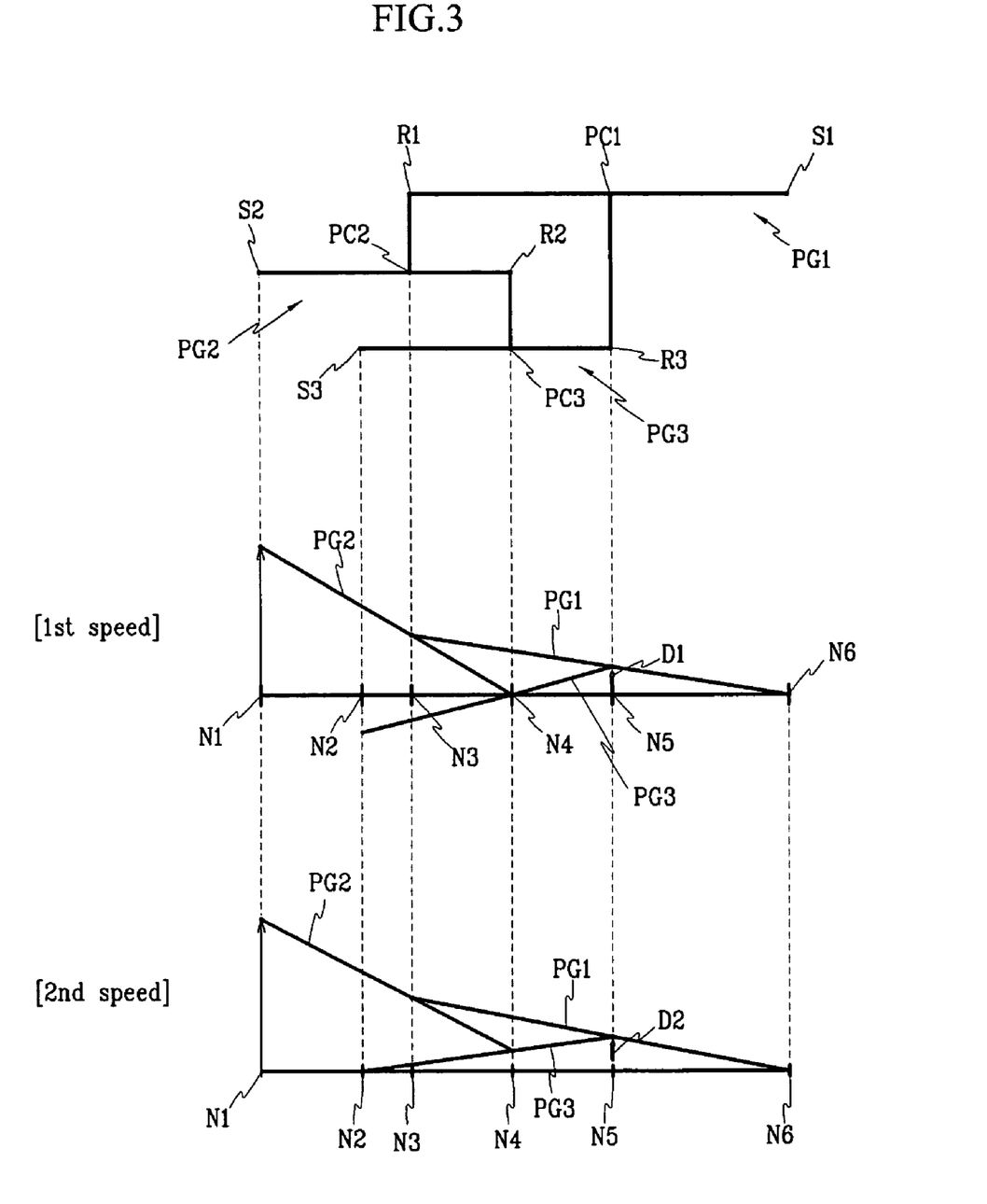
FIG. 3 is a speed diagram of first and second forward speeds of a powertrain according to an embodiment of the present invention.
Figure 4:
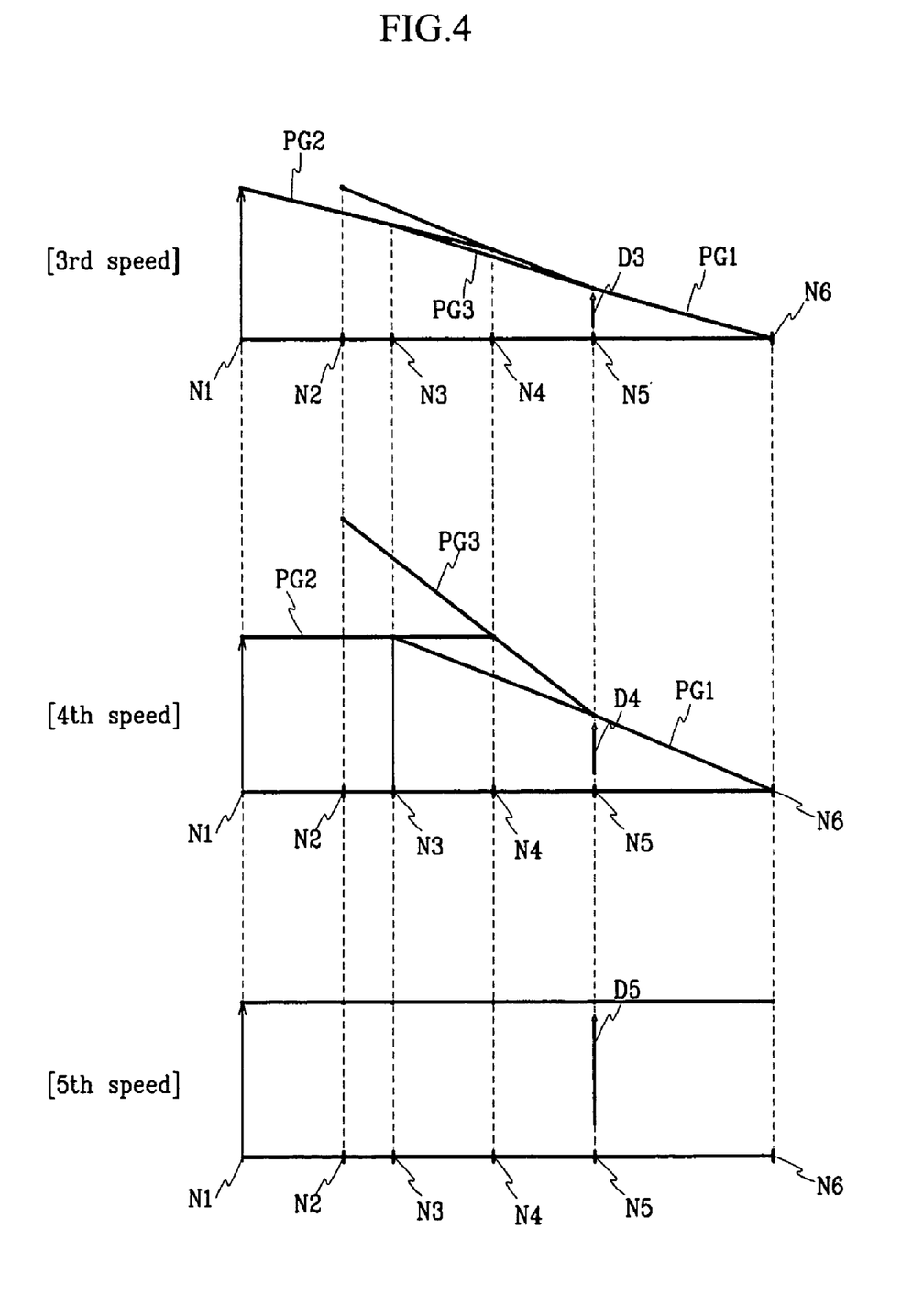
FIG. 4 is a speed diagram of third, fourth, and fifth forward speeds of a powertrain according to an embodiment of the present invention.
Figure 5:
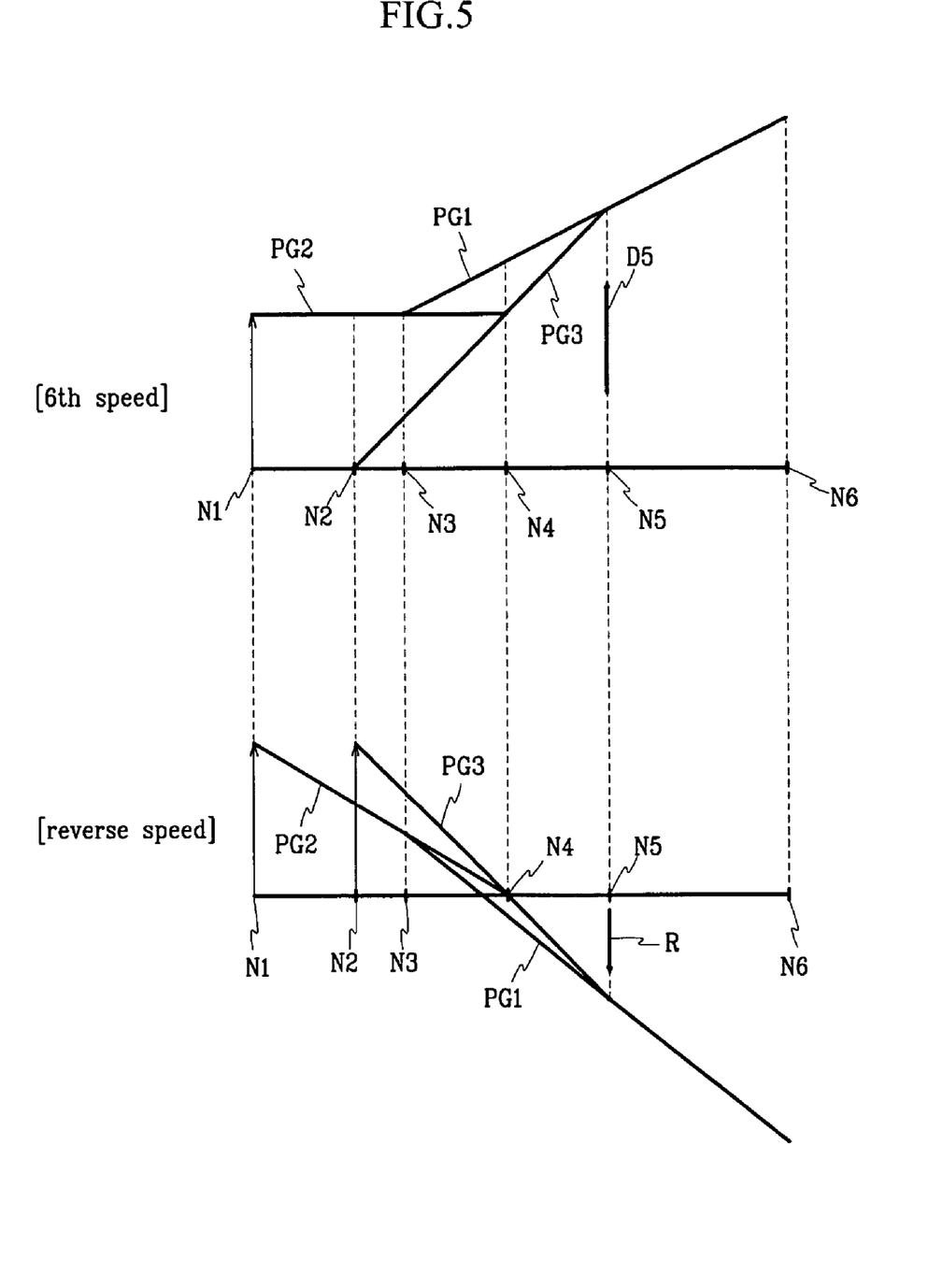
FIG. 5 is a speed diagram of a sixth forward speed and a reverse speed of a powertrain according to an embodiment of the present invention.

FIGS. 3–5 are lever diagrams visualizing shifting of a powertrain according to an embodiment of the present invention. As shown in FIG. 3, a first node N1 corresponds to the second sun gear S2, a second node N2 corresponds to the third sun gear S3, the third node N3 corresponds to the first ring gear R1 and the second planet carrier PC2, the fourth node N4 corresponds to the second ring gear R2 and the third planet carrier PC3, the fifth node N5 corresponds to the first planet carrier PC1 and the third ring gear R3, and the sixth node N6 corresponds to the first sun gear S1. Hereinafter, shifting of a powertrain according to an embodiment of the present invention is described in detail with reference to FIGS. 3–5.

Firstly, at the first forward speed, the first brake B1 and the one-way clutch FC (or the second brake B2 for an engine brake) operate. Then, the fourth node N4 and the sixth node N6 act as stationary elements while the second sun gear S2 of the first node N1 receives an input torque. Therefore, according to a cooperative reaction of the first, second, and third planetary gearsets PG1, PG2, and PG3, the speed diagram becomes as shown in the first speed diagram in FIG. 3. Therefore, shifting to the first forward speed is realized because the speed is changed to and output as D1 through the output element of the fifth node N5.

At the second forward speed, the third brake B3 operates instead of the one-way clutch FC (or the second brake B2) in the first speed. Then, the second node N2 and the sixth node N6 act as stationary elements while the second sun gear S2 of the first node N1 receives an input torque. Therefore, according to a cooperative reaction of the first, second, and third planetary gearsets PG1, PG2, and PG3, the speed diagram becomes as shown in a second speed diagram in FIG. 3. Therefore, shifting to the forward second speed is realized because speed is changed to and output as D2 through the output element of the fifth node N5.

At a third forward speed, the third brake B3 is released and the first clutch C1 operates, in comparison with the second speed. Then, the sixth node N6 acts as a stationary element while the second sun gear S2 of the first node N1 receives an input torque. Therefore, according to a cooperative reaction of the first, second, and third planetary gearsets PG1, PG2, and PG3, the speed diagram becomes as shown in the third speed diagram in FIG. 4. Therefore, shifting to the third forward speed is realized because the speed is changed to and output as D3 through the output element of the fifth node N5.

At a fourth forward speed, the first clutch C1 is released and the second clutch C2 operates, in comparison with the third speed. Then, the sixth node N6 acts as a stationary element while the second sun gear S2 and the third sun gear S3 of the first node N1 receive an input torque. Therefore, according to a cooperative reaction of the first, second, and third planetary gearsets PG1, PG2, and PG3, the speed diagram becomes as shown in the fourth speed diagram in FIG. 4. Therefore, shifting to the fourth forward speed is realized because the speed is changed to and output as D4 through the output element of the fifth node N5.

At a fifth forward speed, the first brake B1 is released and the first clutch C1 operates, in comparison with the fourth speed. Then, no stationary element is formed while the second sun gear S2 of the first note N1 and the third sun gear S3 of the second node N2 receive input torque. Therefore in this case, the first, second, and third planetary gearsets PG1, PG2, and PG3 integrally rotate. Therefore, shifting to the fifth forward speed is realized because the speed is changed to and output as D5 through the output element of the fifth node N5 as shown in the fifth speed diagram in FIG. 4.

At a sixth forward speed, the first clutch C1 is released and the third brake B3 operates, in comparison with the fifth speed. Then, the second node N2 acts as a stationary element while the second sun gear S2 of the first node N1 and the third sun gear S3 of the second node N2 receive an input torque. Therefore, according to a cooperative reaction of the first, second, and third planetary gearsets PG1, PG2, and PG3, the speed diagram becomes as shown in the sixth speed diagram in FIG. 5. Therefore, shifting to the sixth forward speed is realized because the speed is changed to and output as D6 through the output element of the fifth node N5.

Finally at the reverse speed, the first clutch C1 and the second brake B2 operate. Then, the fourth node N4 acts as a stationary element while the second sun gear S2 of the first node N1 and the third sun gear S3 of the second node N2 receive an input torque. Therefore, according to a cooperative reaction of the first, second, and third planetary gearsets PG1, PG2, and PG3, the speed diagram becomes as shown in the reverse speed diagram in FIG. 5. Therefore, shifting to the reverse speed is realized because the speed is changed to and output as R through the output element of the fifth node N5. Speed diagrams of each planetary gearset are well known to a person of ordinary skill in the art, so they are not described in further detail.

Figure 6:
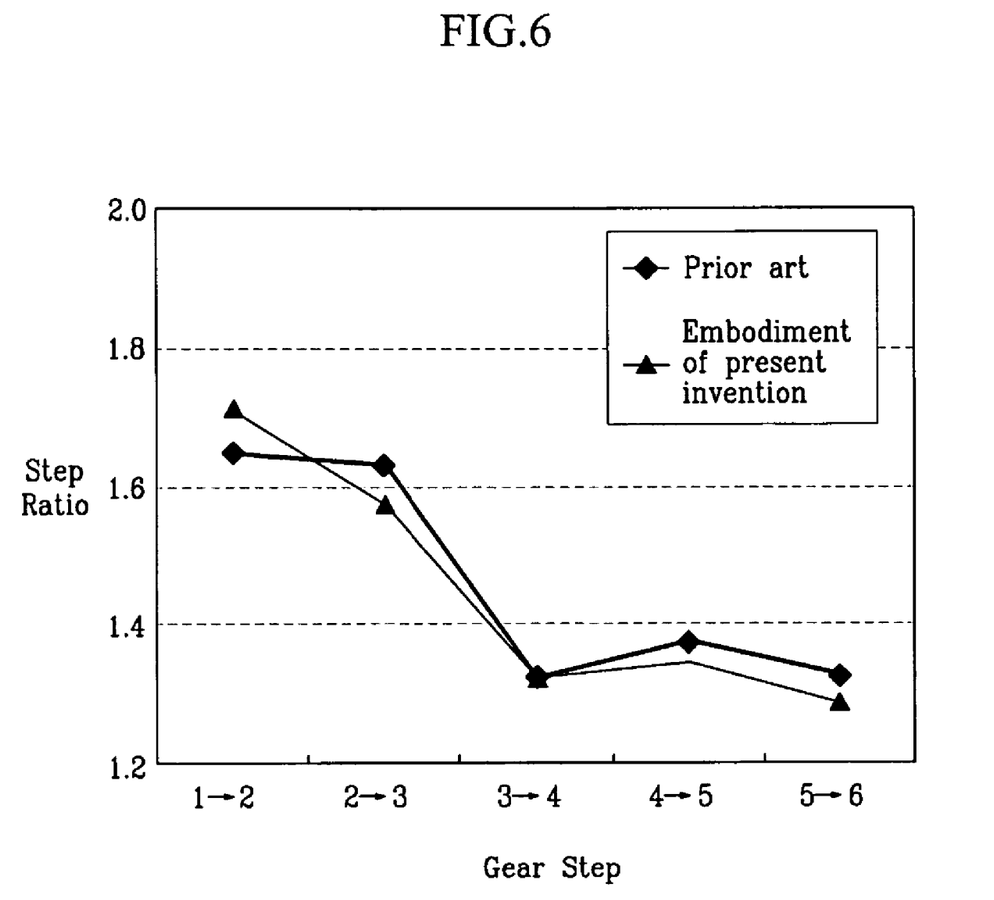
FIG. 6 is a graph comparatively showing speed ratios of a powertrain according to an embodiment of the present invention and a conventional powertrain.
Figure 7:
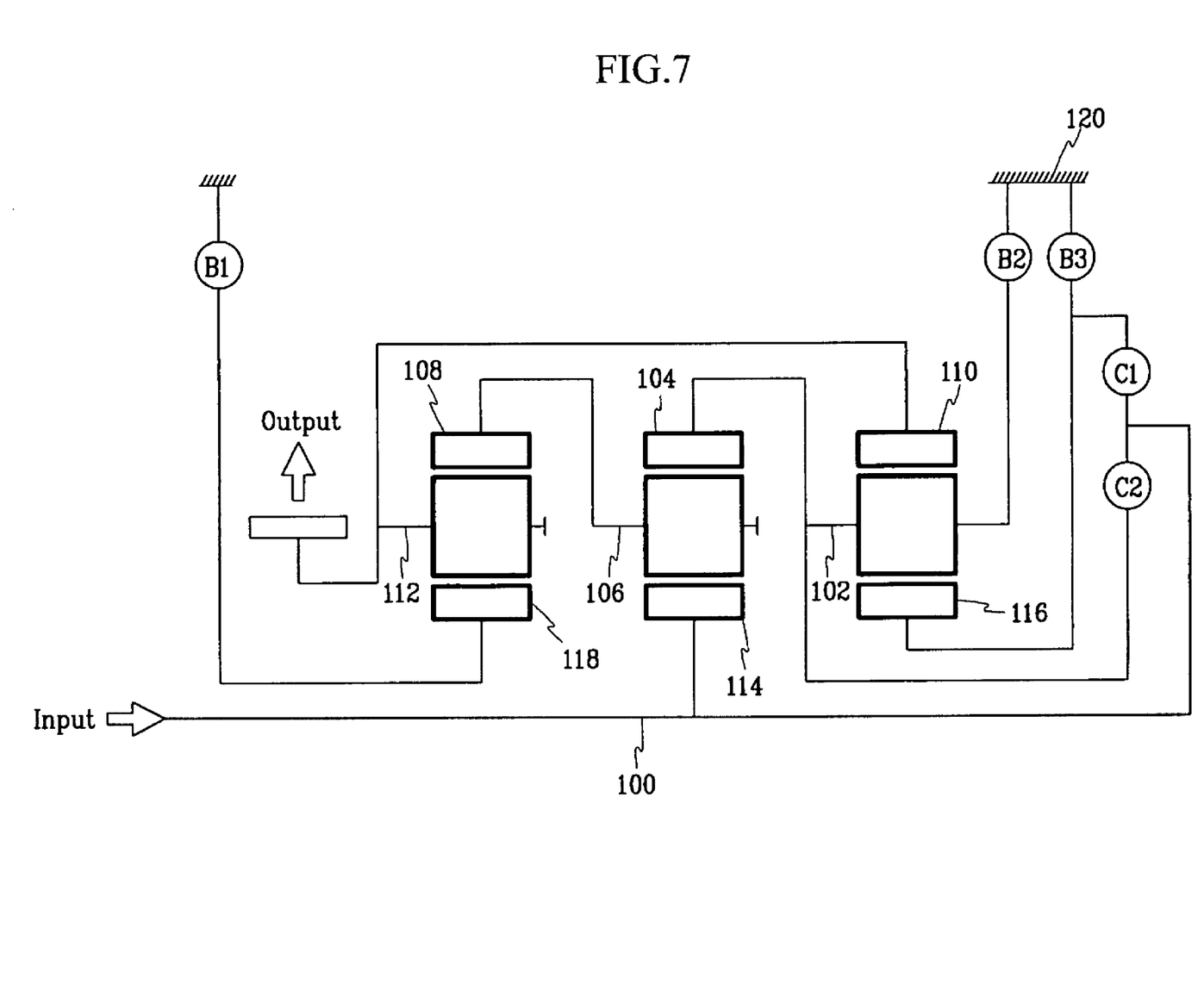
FIG. 7 is an exemplary conventional powertrain.
Figure 8:
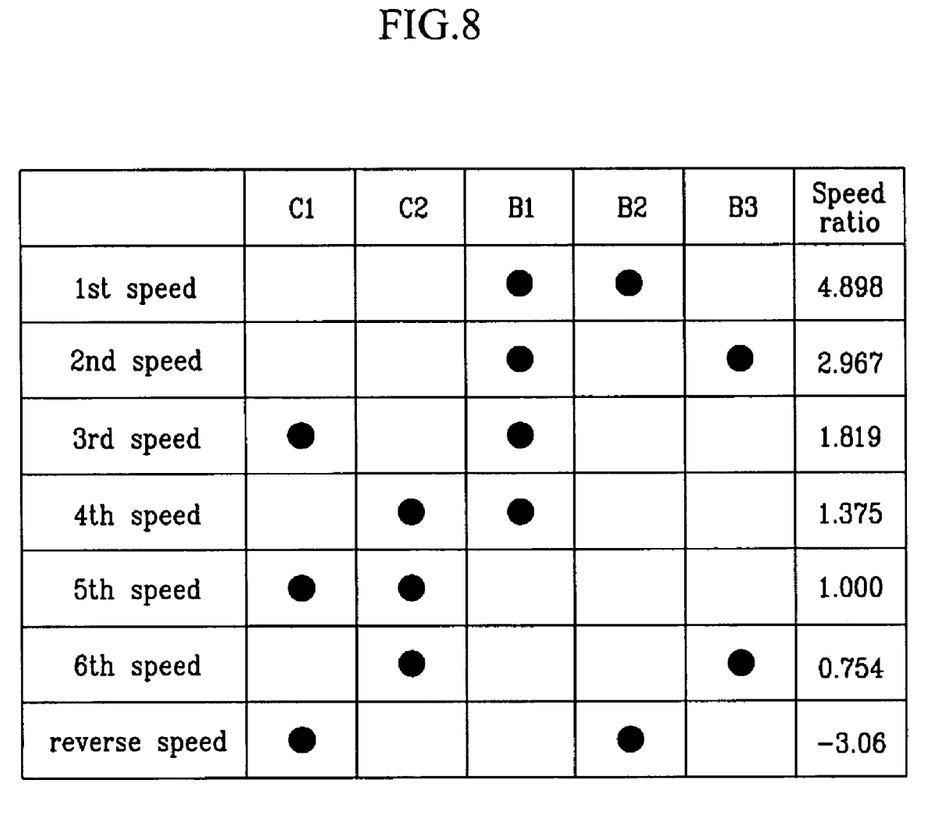
FIG. 8 is an operational chart of a powertrain shown in FIG. 7.

A powertrain according to an embodiment of the present invention shows speed ratios of 4.794 at the first forward speed, 2.796 at the second forward speed, 1.776 at the third forward speed, 1.342 at the fourth forward speed, 1.000 at the fifth forward speed, 0.777 at the sixth forward speed, and 3.480 at the reverse speed. Accordingly, step ratios of speed ratios at each speed are optimally formed as shown in FIG. 6.

According to a powertrain according to an embodiment of the present invention, brakes are clutches are dispersedly disposed to front and rear of the transmission, and accordingly, hydraulic lines may be easily formed in comparison with a conventional powertrain. In addition, shift feel and responsiveness for 1→2 shifting may be enhanced, and hill climbing ability in reverse speed may be enhanced due to a raised reverse speed ratio.

Furthermore, step ratios between speed ratios are optimized such that drivability of a vehicle may be enhanced. Tip-in shock is minimized for low speeds of second and third forward speeds. Tire slip is prevented during acceleration in low speed by reducing the speed ratio of the first forward speed. Finally, driving torque is enhanced by increasing the speed ratio at the highest shift-speed.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission for a vehicle, comprising:
    a first planetary gearset of a single pinion planetary gearset having a first sun gear, a first planet carrier, and a first ring gear;
    a second planetary gearset of a single pinion planetary gearset having a second sun gear, a second planet carrier, and a second ring gear; and
    a third planetary gearset of a single pinion planetary gearset having a third sun gear, a third planet carrier, and a third ring gear, wherein
    the first ring gear and the second planet carrier, the second ring gear and the third planet carrier, and the third ring gear and the first planet carrier are fixedly interconnected respectively such that the combination of the first, second, and third planetary gearsets forms six operational elements,
    a first operational element that always operates as an input element,
    a second operational element that selectively operates as an input element and a stationary element,
    a third operational element that selectively operates as an input element,
    a fourth operational element that selectively operates as a stationary element,
    a fifth operational element that always operates as an output element, and
    a sixth operational element that selectively operates as a stationary element;
    wherein:
        the first operational element corresponds to the second sun gear;
        the second operational element corresponds to the third sun gear;
        the third operational element corresponds to the first ring gear and the second planet carrier;

the fourth operational element corresponds to the second ring gear and the third planet carrier;
the fifth operational element corresponds to the first planet carrier and the third ring gear; and
the sixth operational element corresponds to the first sun gear.

2. The power-train of claim 1, wherein:
the first operational element is directly connected to an input shaft;
the second operational element is connected to the input shaft interposing a first clutch, and is also connected to a transmission housing interposing a first brake;
the third operational element is connected to the input shaft through a second clutch;
the fourth operational element is connected to the transmission housing through a brake and a one-way second clutch;
the fifth operational element is connected to an output gear; and
the sixth operational element is connected to the transmission housing through a third brake.

3. The power-train of claim 2, wherein:
the first and one-way clutches and the first and second brakes interposed to the second and fourth operational elements are disposed to a front of the automatic transmission; and
the second clutch and the third brake interposed to the third and sixth operational elements are disposed to a rear of the automatic transmission.

4. A six-speed powertrain of an automatic transmission for a vehicle, comprising:
a first planetary gearset of a single pinion planetary gearset having a first sun gear, a first planet carrier, and a first ring gear;
a second planetary gearset of a single pinion planetary gearset having a second sun gear, a second planet carrier, and a second ring gear; and
a third planetary gearset of a single pinion planetary gearset having a third sun gear, a third planet carrier, and a third ring gear, wherein
the first ring gear and the second planet carrier, the second ring gear and the third planet carrier, and the third ring gear and the first planet carrier are fixedly interconnected respectively such that the combination of the first, second, and third planetary gearsets forms six operational elements,
a first operational element that always operates as an input element,
a second operational element that selectively operates as an input element and a stationary element,
a third operational element that selectively operates as an input element,
a fourth operational element that selectively operates as a stationary element,
a fifth operational element that always operates as an output element, and
a sixth operational element that selectively operates as a stationary element
wherein;
the first operational element is directly connected to an input shaft;
the second operational element is connected to the input shaft interposing a first clutch, and is also connected to a transmission housing interposing a third brake;
the third operational element is connected to the input shaft through a second clutch;
the fourth operational element is connected to the transmission housing through a second brake and a one-way clutch;
the fifth operational element is connected to an output gear; and
the sixth operational element is connected to the transmission housing through a first brake:
wherein:
the clutches and brakes interposed to the second and fourth operational elements are disposed to a front of the automatic transmission; and
the second clutch and first brake interposed to the third and sixth operational elements respectively are disposed to a rear of the automatic transmission.

5. A six-speed powertrain of an automatic transmission, comprising:
a first planetary gearset having a first sun gear, a first planet carrier, and a first ring gear;
a second planetary gearset having a second sun gear, a second planet carrier, and a second ring gear;
a third planetary gearset having a third sun gear, a third planet carrier, and a third ring gear;
an input shaft coupled to the second sun gear;
a first clutch coupling the third sun gear to the input shaft;
a second clutch coupling the first ring gear and the second planet carrier to the input shaft;
a one-way clutch coupling the second ring gear and the third planet carrier to a transmission housing;
a first brake coupling the first sun gear to the transmission housing;
a second brake coupling the second ring gear and the third planet carrier to the transmission housing;
a third brake coupling the third sun gear to the transmission housing;
an output gear coupled to the first planet carrier and the third ring gear, wherein
the first ring gear and the second planet carrier, the second ring gear and the first planet carrier, and the third ring gear and the third planet carrier are fixedly interconnected respectively such that the combination of the first, second, and third planetary gearsets forms six operational elements.

* * * * *